US010778727B2

(12) United States Patent
Ho

(10) Patent No.: US 10,778,727 B2
(45) Date of Patent: *Sep. 15, 2020

(54) CONTENT ENABLING SYSTEM

(71) Applicant: Pin-Han Ho, Waterloo (CA)

(72) Inventor: Pin-Han Ho, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,034

(22) Filed: Oct. 4, 2018

(65) Prior Publication Data

US 2019/0036980 A1    Jan. 31, 2019

Related U.S. Application Data

(62) Division of application No. 14/961,216, filed on Dec. 7, 2015, now Pat. No. 10,142,375.

(60) Provisional application No. 62/176,651, filed on Feb. 25, 2015.

(51) Int. Cl.
| *G06F 15/16* | (2006.01) |
| *H04L 29/06* | (2006.01) |
| *H04W 4/021* | (2018.01) |

(52) U.S. Cl.
CPC ...... *H04L 65/1063* (2013.01); *H04L 65/4069* (2013.01); *H04L 65/602* (2013.01); *H04W 4/021* (2013.01)

(58) Field of Classification Search
CPC ............... H04L 65/602; H04L 65/1063; H04L 65/4069; H04W 4/021
USPC .... 709/202–203, 217–219; 455/456.1–456.6
See application file for complete search history.

(56) References Cited

U.S. PATENT DOCUMENTS

| 8,314,838 | B2 | 11/2012 | Alberth, Jr. |
| 8,700,659 | B2* | 4/2014 | Skeen .................. G06F 3/0484 |
| | | | 709/203 |
| 8,755,738 | B2 | 6/2014 | Forutanpour et al. |
| 10,142,375 | B2* | 11/2018 | Ho ...................... H04L 65/1063 |
| 2010/0260426 | A1 | 10/2010 | Huang et al. |
| 2013/0079034 | A1* | 3/2013 | Taylor .................. H04W 4/021 |
| | | | 455/456.2 |

(Continued)

OTHER PUBLICATIONS

Aida et al., "Real-Time Information Distribution at a Shopping Mall Using Android Phones," Wireless Communications and Mobile Computing Conference (WCMC), 2011 7th International, Jul. 2011, pp. 1923-1928.

(Continued)

*Primary Examiner* — Bharat Barot
(74) *Attorney, Agent, or Firm* — Borden Ladner Gervais LLP; Michael J. Damiani

(57) ABSTRACT

A system and method for remote acquisition of Internet content in a cyber-physical system. A cyber-physical system can include a multitude of electronic devices that are networked with each other, where some devices control each other to execute particular functions. According to the present embodiments, a user can request Internet information relating to sensory content presented to him/her by a content provider in a particular location by actuating their mobile device. Based on the time of the request and the location and direction of the mobile device, Internet information related to the sensory content that stimulated the user to actuate the mobile device is delivered to the mobile device or a cloud-based user account, for viewing. Such information can be provided via the Internet.

21 Claims, 10 Drawing Sheets

(56) References Cited

U.S. PATENT DOCUMENTS

2014/0063180 A1* 3/2014 Sharma ............... G08C 19/00
348/36

OTHER PUBLICATIONS

Chattopadhyay et al., "Identification of Trademarks Painted on Ground and Billboards Using H.264 Compressed Domain Features from Sports Videos," Computational Intelligence Modelling and Simulation (CIMSIM), 2010 Second International Conference, Sep. 2010, pp. 219-223.
Choudhury et al., "Software Documentation in a Globally Distributed Environment," Global Software Engineering (ICGSE), 2014, IEEE 9th International Conference, Aug. 2014, pp. 90-94.
Cyclone-V SaCs, cited in a Technical Paper provided on Oct. 9, 2015, not published, entitled "On Achieving Cyber-Physical Real-time Snapshop Acquisition in Billboard/Signage Networks", retrieved on line Mar. 2, 2016. Retrieved from https://www.altera.com/products/soc/portfolio/cyclone-v-soc/overview.html>.
Deitz, "Developing a Content Management System for Siguccs," proceedings of the 36th Annual ACM SIGUCCS '08, Oct. 19-22, 2008, pp. 141-144 [Online]. Retrieved from http://doi.ac111.org/10.1145/1449956.1450000>.
Gnu Octave, entitled "On Achieving Cyber-Physical Real-time Snapshop Acquisition in Billboard/Signage Networks," cited in a Technical Paper provided on Oct. 9, 2015, not published. Retrieved on line Mar. 2, 2016 [online]. Retrieved from the Internet:.
Lee et al., "The Application of Digital Signage System Using Smart Device," Advanced Communication Technology (ICACT), 2014 16th International Conference, Feb. 2014, pp. 675-677.
Li et al., "A Confidence Based Recognition System for tv Commercial Extraction," Proceedings of the Nineteenth Conference on Austalasian Database, Jan. 2008, vol. 75, ADC 2008, 2007, pp. 57-64.
Nath et al., "Content Management System: Comparative Case Study," Software Engineering and Service Sciences (ICSESS), IEEE International Conference Jul. 2010, pp. 624-627.
Raspberry Pi, Cited in a Technical Paper Provided on Oct. 9, 2015, Not Published, Entitled "On Achieving Cyber-Physical Real-time Snapshop Acquisition in Billboard/Signage Networks," 9 pages [online], [retrieved on line Mar. 2, 2016]. Retrieved from the Internet: URL: https://www.raspberrypi.org>.
Recommendation ITUR BT.656-Interface for Digital Component Video Signals in 525-Line and 625-Line Television Systems Operating at the 4:2:2 level of Recommendation ITU-R BT.601, Dec. 2007 [online]. Retrieved from the Internet:.
She et al., "Smart Signage: A Draggable Cyber-physical Broadcast/Multicast Media System," Emerging Topics in Computing, IEEE Transactions, 2012, pp. 468-476.
She et al., "Smart Signage: An interactive Signage System with Multiple Displays," Green Computing and communications (GreenCom), 2013 IEEE International Conference, IEEE Cyber, Physical and Social Computer, Aug. 2013, pp. 737-742.
U.S. Appl. No. 14/961,216, Notice of Allowance dated Jun. 15, 2018.
U.S. Appl. No. 14/961,216, Non-Final Office Action dated Feb. 9, 2018.
U.S. Appl. No. 14/961,216, Restriction Requirement dated Nov. 16, 2017.
Yoshida et al., "Displaying Free-Viewpoint Video with User Controlable Head Mounted Display Demo," Mixed and Augmented Reality (ISMAR}, 2014 IEEE International Symposium, Sep. 2014, pp. 389-390.

* cited by examiner

CONTENT ENABLING SYSTEM

CROSS REFERENCE TO RELATED APPLICATIONS

This application is a divisional of U.S. patent application Ser. No. 14/961,216, filed on Dec. 7, 2015 and claims the benefit of priority of U.S. Provisional Patent Application No. 62/176,651 filed Feb. 25, 2015, which are hereby incorporated by reference.

FIELD

The present disclosure relates generally to cyber-physical systems. More particularly, the present disclosure relates to remote acquisition of multi-media content in a cyber-physical system.

BACKGROUND

Mobile devices are pervasive in the Internet connected environment, and are used for many purposes and applications, such as for example, conducting business, social media, research, and entertainment.

With a mobile device, virtually any type of information can be accessed from the Internet, as individual users and entities such as companies and organizations, post information for access by users. Some information is freely accessible, while restricted information may require establishment of a user account with the relevant website in order to gain access to the information they provide. This may require payment of a subscription fee, or merely the provision of a valid email address. Examples of free or restricted information include multi-media, articles, product information etc.

Accordingly, users have the ability to access any information on the Internet related to anything they have been presented with. For example, a user may notice an advertisement on an electronic display panel and wish to access the displayed website using their mobile device. Unfortunately, the advertisement may be one of several "rolling" advertisements displayed for a limited period of time before transitioning to the next advertisement. Hence the user may not have sufficient time to properly remember the web address or even the name of the product, service or company. The user could use the camera in their mobile device to quickly take a picture of the displayed content, but the usefulness of the image to obtain the relevant information depends on the image quality and the user remembering to refer to the image later.

Another common use of mobile device cameras is to capture images and videos of live events, such as concerts by example, as the user may wish to retain the image and/or video as a personal memento of their experience. Unfortunately, live events can occur in environments with non-ideal conditions for obtaining a high quality image, such as with low level lighting. In such situations, the user would need to search the Internet in hopes for better quality pictures taken by others, which may not match the image desired by the user representing a particular time of the event.

Ultimately, users may wish to obtain more information relating to something they have been presented with in order to enhance their experience or knowledge, and with a greater level of convenience.

SUMMARY

In a first aspect, the present disclosure provides a method of remote acquisition of Internet content. The method includes presenting sensory content at a location within a content enabled region, and storing Internet information corresponding to the sensory content on a content management server; actuating a mobile device at a specific time within the content enabled region to generate a token including at least one content identification parameter; selecting the Internet information based on the at least one content identification parameter of the token; and, providing the Internet content corresponding to the content enabled region to the mobile device or a user account.

In a second aspect, the present disclosure provides a system for remote acquisition of Internet information. The system includes a content enabling device, a mobile device and a cloud based content management server. The content enabling device is in communication with the Internet, and has a wireless interface for providing wireless connectivity to a content enabled region surrounding the content enabling device. The mobile device is within the content enabled region and configured to generate and transmit a token including at least one content ID parameter of location of the mobile device in response to an actuation of the mobile device at a specific time. The cloud based content management server stores Internet content corresponding to the content enabling device and is configured with a location of the content enabling device and an area of the content enabled region. The content management server is further configured to receive the token from the mobile device, determine if the location of the mobile device in the token is within the content enabled region, and to transmit the Internet content to the mobile device or a cloud based user account when the location of the mobile device is determined to be within the content enabled region.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a system and method for remote acquisition of Internet content in a cyber-physical system. A cyber-physical system can include a multitude of electronic devices that are networked with each other, where some devices control each other to execute particular functions. According to the present embodiments, a user can request Internet information relating to sensory content presented to him/her by a content provider in a particular location simply by actuating their mobile device. Based on the time of the request and the location and direction of the mobile device, Internet information related to the sensory content that stimulated the user to actuate the mobile device is delivered to the mobile device or a cloud-based user account, for viewing. Such information can be provided via the Internet and/or locally from the location the sensory content is presented.

Figure 1:
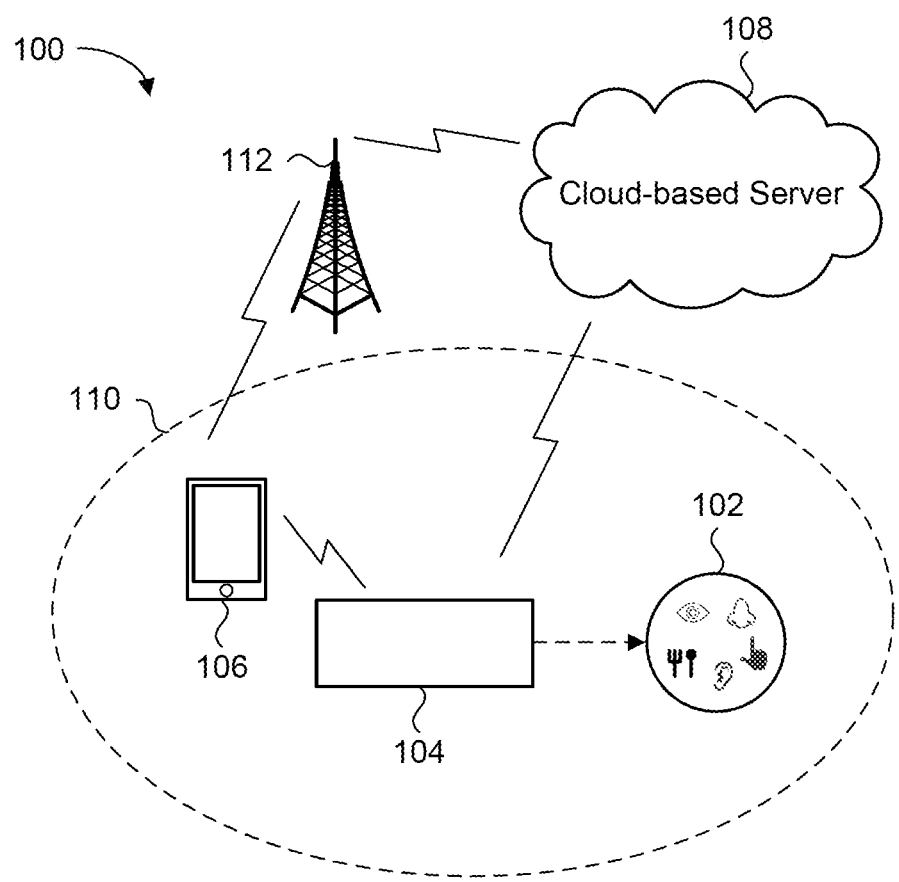
FIG. 1 shows an general cyber-physical system configured for remote acquisition of Internet information, according to a present embodiment.

FIG. 1 shows an example cyber-physical system configured for remote acquisition of Internet information, according to a present embodiment. The cyber-physical system 100 of FIG. 1 includes an apparatus for providing sensory content 102, a content enabling device 104, a wirelessly enabled mobile device 106 and a cloud-based content management server 108. It is noted that the sensory content apparatus 102 and the content enabling device 104 are both located within a physical area referred to as a content enabled region 110. In some embodiments both elements 102 and 104 can be in close proximity with each other. An optional cellular network 112 may be present to provide alternate wireless communication between the mobile device 106 and content management server 108. FIG. 1 is a generic embodiment of the present invention.

The sensory content apparatus 102 can provide different categories of content, such as visual, audio, touch, smell or taste content for sensing by a person. Examples of visual content include specific scenes, pictures, electronically generated static images and video. In the present embodiments, video or video content refers to motion video which can include or exclude audio, and electronically generated images and video are referred to generically in the present application as digital media. In such cases, the apparatus 102 can be the scene itself, an electronic digital display panel or a physical panel with a printed image and text. An example of audio content includes music. In such a case, the apparatus 102 can be an audio player with a speaker. An example of touch content can include a material for tactile sensing. An example of smell content can include any material or device that emits a scent or fragrance, such as perfume. An example of taste content can include food which can be eaten. For touch, smell and taste types of content, the apparatus 102 can be a table or display stand upon which the material, perfume and food can be presented to the user. The sensory content apparatus 102 can provide different content of the same category. For example, different advertisements directed to different products or services can be provided on the electronic digital display panel over time.

When a user encounters sensory content apparatus 102, of any type as outlined above, they may be stimulated and wish to receive Internet information relating to the specific content being presented. According to the present embodiments, the user makes such a request by actuating their mobile device 106. Mobile device actuation is any action taken by the user to effect some type of input on the mobile device 106. Following is an overview of the core functions of content enabling device 104, mobile device 106 and content management server 108, according to the present embodiments.

The mobile device 106 is responsible for generating a token to request Internet information related to the content provided by sensory content apparatus 102. This token includes at least one content identification (ID) parameter. The content ID parameters according to the present embodiments can include direction of the mobile device 106, current time of the mobile device 106 at the time a request for Internet information is made, and current location of the mobile device 106 at the time a request for Internet information is made. Persons skilled in the art should understand that most mobile devices, such as smart phones and tablets, include a GPS transceiver and compass. In the event a GPS signal is not available, location information can be provided to the mobile device 106 using at least one beacon installed within the content enabled region 110.

The content enabling device 104 provides wireless connectivity to content enabled region 110 via a wireless interface, such as WiFi for example. In some embodiments to be described later, optional wireless signal extenders such as WiFi repeaters, can be employed to increase the range of the wireless network in a particular physical area. The content enabling device 104 receives the token from mobile device 106 and passes the token to content management server 108. In some embodiments, the content enabling device 104 may modify the token to add a content ID parameter before issuing it to the content management server 108.

The content enabling device 104 can optionally output and transmit locally generated static images or video content for storage on content management server 108 at different times. By example, static images can have a time stamp corresponding to when it was captured, while video content can have a time stamp corresponding to the start time of the video. In such an embodiment, content enabling device 104 can optionally enable synchronization of time between mobile device 106 and content enabling device 104 to facilitate matching of time stamped content with the current time of the mobile device at the time of its request generation. Any locally generated digital media content sent to the content management server 108 will include a preset unique device ID of the content enabling device 104 or some other unique ID information linking it to content enabling device 104. The unique ID and any time stamp information can be provided as meta-data with the transmitted digital media.

The content management server 108 is configured with the unique device ID and location of content enabling device 104. The owner of the content can provide GPS coordinates approximating the location of content enabling device 104. Alternately, the content enabling device 104 can include a GPS transceiver to automatically provide its location. When the content management server 108 receives digital media, it checks for the unique device ID and links the received digital media to the matching content enabling device, such as content enabling device 104, in a relational database. The content management server 108 can further store preset content information linked to the content enabling device 104, and by extension its location, in the relational database. The Internet information can include the received digital media, preset content and any information deliverable over the Internet.

The content management server 108 can be configured to set the area of content enabled region 110. In some embodiments this area can be no greater than the range of the wireless interface of a single content enabling device 104. In other embodiments, this area can be greater than the range of a single content enabled region 110 wireless interface when wireless extenders are used and/or multiple content enabling devices 104 are located in proximity to each other. Generally, the area can be set as a radius from the content enabling device 104 or any non-circular boundary surrounding one or more content enabling devices 104, provided they do not exceed the wireless range.

The content management server 108 receives tokens from either the mobile device 106 or the content enabling device 104, and is configured to identify the Internet content stored on the content management server 108 that best matches the at least one content ID parameter (direction, time, location) in the token. Further details on how the content ID parameters are used to perform a best match to content stored in the content management server 108 is discussed later. The identified Internet content is then delivered by the content management server 108 to the mobile device 106 or a cloud based account of the user of mobile device 106.

The above description of the generic embodiment of FIG. 1 is intended to provide a basic understanding of the cyber-physical system configured for remote acquisition of Internet information. Specific details and application examples of the embodiment of FIG. 1 now follow.

Figure 2:
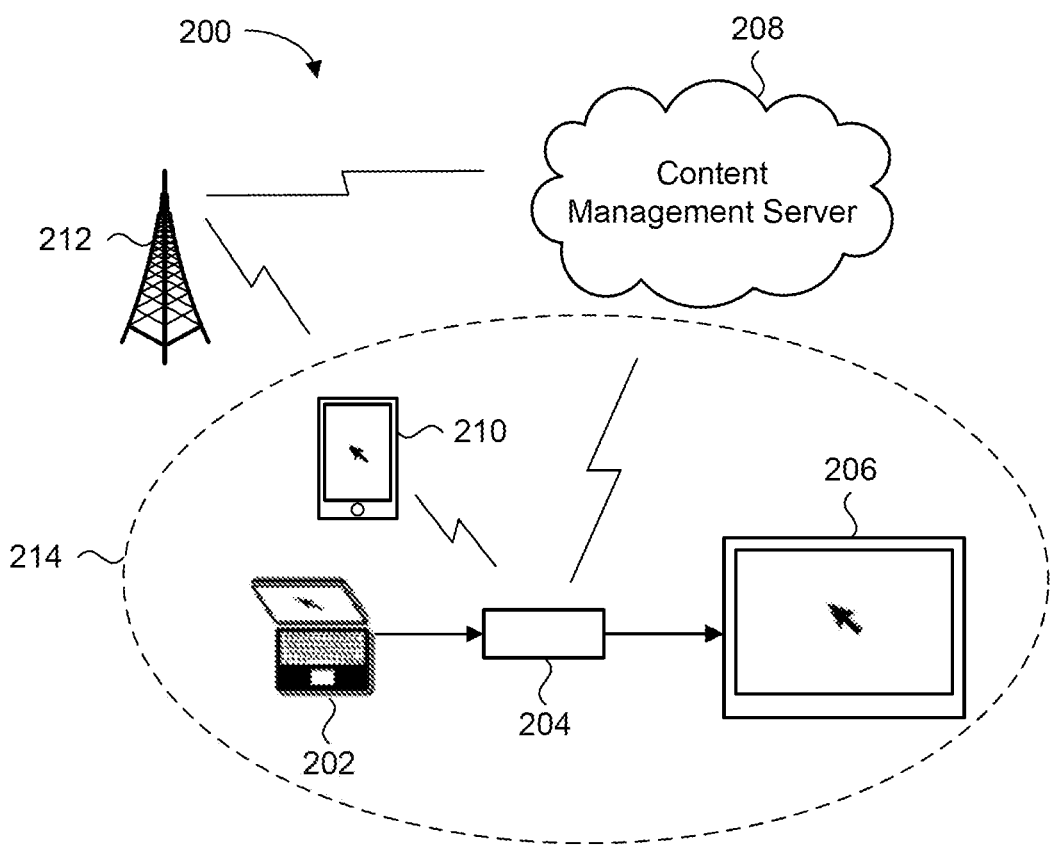
FIG. 2 shows an example cyber-physical system embodiment of FIG. 1, configured for remote acquisition of static image content based Internet information, according to a present embodiment.

FIG. 2 shows an example cyber-physical system embodiment of FIG. 1, configured for remote acquisition of visual content based Internet information, according to a present embodiment. The cyber-physical system 200 includes a computer 202, a content enabling device content enabling device 204, an electronic display panel 206, a content management server (CMS) 208, a mobile device 210 and an optional cellular communications network 212. The content enabling device 204 and the mobile device 210 can communicate wirelessly via WiFi, but any other wireless communication system can be used. It is noted that content enabling device 204, CMS 208, mobile device 210 and cellular communications network 212 are the same as content enabling device 104, content management server 108, mobile device 106 and cellular network 112 respectively of FIG. 1. The content enabling device 204, electronic display panel 206 and mobile device 210 should be within a content enabled region 214 set by CMS 208 after having knowledge of the location of content enabling device 204.

The computer 202 functions as a content source for providing multi-media content, in particular static images or video, to the content enabling device 204 via a cable such as an HDMI, VGA or DVI cable. The present example is described in the context of static images being provided by computer 202. Any type of cable can be used to provide the multi-media content to the content enabling device 204. The content enabling device 204 directly couples the multi-media content to the electronic display panel 206 via another suitable cable. For example multi-media content such as visual advertisements and information for a particular product or service can be presented on electronic display panel 206. Different presented images that change over time may all relate to the same product or service, and are hence considered time changing content The content enabling device 204 therefore has an input port for receiving the cable connected to the computer 202 and an output port for receiving the cable connected to the electronic display panel 206. The content enabling device 204 in the present embodiment of FIG. 2 is configured to tap the multi-media signal as it is passed through from the input port to the output port, and periodically obtains high quality snapshot images of the images. This function of content enabling device 204 is now described in further detail below.

When coupled to a content source, the content enabling device 204 is configured to take snapshots of the provided content at predetermined time intervals, as it is being presented on the electronic display panel 206 in real time. These snapshots can be high quality frame grabs of the static image at specific times and are optionally time stamped with a time they are taken. The timestamp can be based on any common reference time, such as the Internet time, which can be obtained by the content enabling device 204 as it is connected to the Internet through its wireless interface. Alternately, the common reference time can be Greenwich time. Each snapshot and its corresponding timestamp information are transmitted to CMS 208, which stores and relates the snapshot to the device ID and location of the content enabling device 204 as previously described for the embodiment of FIG. 1.

Figure 3:
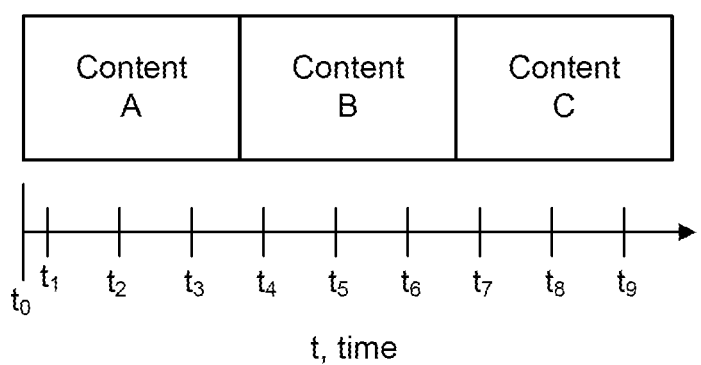
FIG. 3 is an example timeline showing when snapshots are taken by a content enabling device for static image content, according to a present embodiment.

FIG. 3 is an example illustrating a timeline when snapshots, also referred to as a specific instance of time changing content, are taken by the content enabling device 204. It is assumed that computer 202 of FIG. 2 presents three different static images/graphics onto electronic display panel 206. The multi-media referred to as "Content A" is presented starting at time $t_0$, followed sequentially by "Content B" and later by "Content C". After presenting Content C, the computer 202 loops back to repeat the presentation with Content A. It is assumed in this example that all three content are related to the same product and only one iteration of the three contents is shown. The content enabling device 204 receives the static images corresponding to Content A, Content B and Content C and takes snapshots of the content at time intervals $t_1$ to $t_9$. Accordingly, the snapshots taken at times $t_1$, $t_2$ and $t_3$ will be the same Content A image. Similarly, snapshots taken at times $t_4$, $t_5$ and $t_6$ will be the same Content B image. Similarly, snapshots taken at times $t_7$, $t_8$ and $t_9$ will be the same Content C image.

Shorter snapshot intervals can be used, meaning the time between snapshots is shortened. Alternately, longer snapshot intervals can be used. The advantage of a shorter snapshot interval is ability to capture content that changes quickly. For example, Content A can appear briefly, therefore short snapshot intervals will allow the user to capture such quickly presented images.

Returning to FIG. 2, the content enabling device 204 is further configured to generate low quality resolution and small file size images, such as thumbnails, related to the sensory content being presented at predetermined time intervals. In the present example of FIG. 2, the thumbnails correspond to the static images presented on electronic display panel 206. In an specific example where a digital image is presented on the electronic display panel 206 for 10 seconds, a thumbnail can be generated each second concurrently with a corresponding snapshot being taken. Each of these thumbnails has the same time stamp as the corresponding snapshot, which is presented on electronic display panel 206. Each thumbnail and corresponding time stamp is broadcast wirelessly by content enabling device 204.

The thumbnails are intended to have a small file size to minimize wireless bandwidth use and increase the speed at which the thumbnail is broadcast to any nearby mobile devices, such as mobile device 210. Meanwhile, the high quality snapshot image and its timestamp is transmitted to CMS 208 at any suitable time and at any speed, because receipt of the snapshot image by CMS 208 is not time sensitive.

The mobile device 210 can run an application to configure it to detect entry into a content enabled region 214 and to generate a suitable alert on the mobile device 210. The application is further configured to receive each thumbnail and corresponding timestamp broadcast by content enabling device 204. It is assumed before hand that the user has created a user account for receiving requested snapshots and additional Internet information to be stored in the cloud. The application further configures the mobile device 210 to respond to an actuation when the user decides that more information relating to a presented sensory content at a particular time is desired. Persons skilled in the art can program such applications for mobile devices without difficulty. Example actuations can include a specific gesture on the touch screen, a button press, a particular motion which can be sensed by the accelerometer of the mobile device 210, or a specific sound picked up by the microphone of the mobile device 210. Any type of mobile device actuation can be used in the present embodiments. The mobile device 210 can also include a GPS transceiver for location determination and a compass for direction determination of the mobile device 210. Wireless beacons can be positioned in the content enabled region 214 to transmit geographic location information of the content enabling device 204 to the application. The use of beacons for this application are well known in the art, and further discussion of their operation is unnecessary.

Now if a user of mobile device 210 wishes to obtain the image currently presented on electronic display panel 206, they can actuate their mobile device 210 in the manner previously described. Actuation of the mobile device 210 at a specific time initiates a request for content, such as a snapshot of a displayed image, and may be deemed a request for more information relating to the content currently presented on electronic display panel 206. According to the present embodiments, the mobile device 210 generates a token that includes the content ID parameters of at least time, current location at the time of the actuation, and compass direction. This token can be transmitted to the content enabling device 204, which passes the token to CMS 208, or this token can be transmitted directly to CMS 208 via cellular network 212.

The compass direction is information accessible by the application, and it is assumed the compass within the mobile device 210 provides a direction relative to magnetic north or true north. As previously discussed, the mobile device 210 may have a GPS transceiver to automatically determine its geographic location. If it is known that the GPS signal cannot be received by mobile devices, because for instance the content enabled region 214 is underground or in a building, then beacons can be deployed to provide the location information to the mobile device 210. The time content ID parameter is now discussed in further detail.

In the present embodiment of the system where thumbnails and timestamps are broadcast by content enabling device 204, the mobile device 210 receives the timestamps of the thumbnails and based on when actuation occurs, the time parameter becomes the timestamp corresponding to the last received thumbnail. While a time stamp is used in this embodiment, a sequence number could be used instead.

In variation of the present embodiment, the content enabling device 204 does not provide timestamps for the thumbnails. The mobile device 210 in this embodiment is configured to set the time parameter of the token to be a common reference time synchronized with the content enabling device 204. It is assumed that the content enabling device 204 and the mobile device 210 have access to the Internet, and thus can synchronize to the common reference clock. Alternately, if the mobile device is completely offline, meaning it is not connected to the Internet via the content enabling device 204, WiFi or the cellular network 212, then the time parameter of the token is set to the local time of the mobile device 210. A discussion of how these time parameters of the token is used by CMS 208 is described later.

Optionally, the last received thumbnail can be presented on the display of the mobile device 210 as a form of acknowledgement that actuation of the mobile device 210 has occurred and that a request token has been generated.

In yet a further alternate embodiment, thumbnails are not displayed by the mobile device, or simply not generated and broadcast wirelessly. Such an embodiment could be used in a situation where there may be two content enabling devices in close proximity to each other and within a content enabled region, each presenting different static images on a respective electronic display panel. Therefore, broadcasting of thumbnails by both content enabling devices may not provide practical information as the mobile device does not know which thumbnail the user intends to capture and request Internet information for. However, as both content enabling devices should be connected to the Internet, they are both synchronized to the common reference time and therefore can be configured to generate snapshots at the same time. In this alternate embodiment, the mobile device can be configured to ignore both received thumbnails and to display a generic image or message indicating that a request has been made. As will be discussed in further detail later, direction information in the token can be used by the CMS to determine which content was selected by the user request for Internet information.

In a further alternate configuration, the mobile device provides a partial token including just the location and direction information. When the token is sent to the content enabling device 204, the content enabling device 204 completes the token by adding the common reference time. It is assumed the delay between generating the partial token, sending it to the content enabling device 204 is minimal.

CMS 208 is configured with the geographic location of content enabling device 204, and thus can be configured to set the area of content enabled region 214. It is noted this content enabled region 214 is distinguished from a non-content enabled region where an electronic display is presenting multi-media content or other sensory content is presented, but does not have a content enabling device 204. The geographic location of the content enabling device 204 can be associated with preset content information related to the content displayed on electronic display panel 206. This optional preset content information and the snapshots received from content enabling device 204 are stored in CMS 208.

CMS 208 receives the token from the mobile device 210 and uses the content ID parameters to best match the token to related Internet content stored on CMS 208. CMS 208 first uses the location information in the token to determine if the mobile device 210 was within a content enabled region 214. If not, the request can be ignored. Otherwise, CMS 208 deems that a valid request has been made by mobile device 210. Because the location of content enabled region 214 and its corresponding content enabling device 204 is known, and the mobile device 210 location is within the content enabled region 214, CMS 208 can identify the Internet content associated with this particular location. Now CMS 208 uses the time parameter of the token to identify a specific time related content, such as the stored snapshots with corresponding timestamps.

In the present embodiment where the time parameter is the timestamp corresponding to the last received thumbnail, matching of the time parameter to the timestamp of a snapshot is trivial. Then the matching snapshot and any other related content is delivered to the mobile device 210 or the user account.

In the embodiment where no timestamps are received by the mobile device 210 and the time parameter of the token is a common reference time with the content enabling device 204, CMS 208 performs calculations to determine which timestamped snapshot is to be selected. For example, if the time parameter of the token falls between two consecutive timestamped snapshots, then the earlier snapshot is selected.

In the embodiment where the time parameter of the token is a local time of the mobile device 210, CMS 208 determines an offset between the common reference time and the local time of the mobile device 210 (once it is connected to the Internet), and applies the offset to the time parameter of the token to calibrate it to the common reference time. Then if the calibrated time parameter of the token falls between two consecutive timestamped snapshots, then the earlier snapshot is selected.

These are examples of synchronization of a time parameter of a token and a timestamp of a snapshot. Other techniques known in the art can be used with equal effectiveness for this purpose.

It is noted that some content ID parameters may not be used by CMS 208, if its relational database does not include this information for the content enabling device 204, as it may not be relevant to identifying content related to the request. In the presently described example, the token provides direction information which is not used by CMS 208. An example of where direction information is relevant is described later.

To summarize, a token containing at least the location of the mobile device 210, its direction and time information are sent to the CMS 208 either directly via the cellular network 212 or via the content enabling device 204. The CMS 208 can then determine that the mobile device 210 is proximate to content enabling device 204. Then the set of snapshots from the selected media processing device 204 can be processed to identify the one with matching timestamp to the timestamp of token, or the one that is best matching to the time information in the token. The CMS 208 can then transmit the matching snapshot with optional preset Internet information to the mobile device 210, or to the user account.

For example, if the snapshot is an advertisement image, the web address of the vendor, digital flyers and other related information can be provided to the mobile device or user account. The content owner can decide what type of additional Internet information should be provided in response to requests made by a mobile device 210 at a content enabled region 214 presenting their content. Therefore, not only do users obtain a high quality snapshot of information obtained at a content enabled region 214, users further obtain pertinent rich content from the Internet to enhance their experience.

The previous embodiment of FIG. 2 discusses the use of a computer 202 to provide visual content in the form of static images or graphics onto an electronic display panel 206. According to yet another embodiment, live video can also be captured for later delivery to a mobile device.

Figure 4:
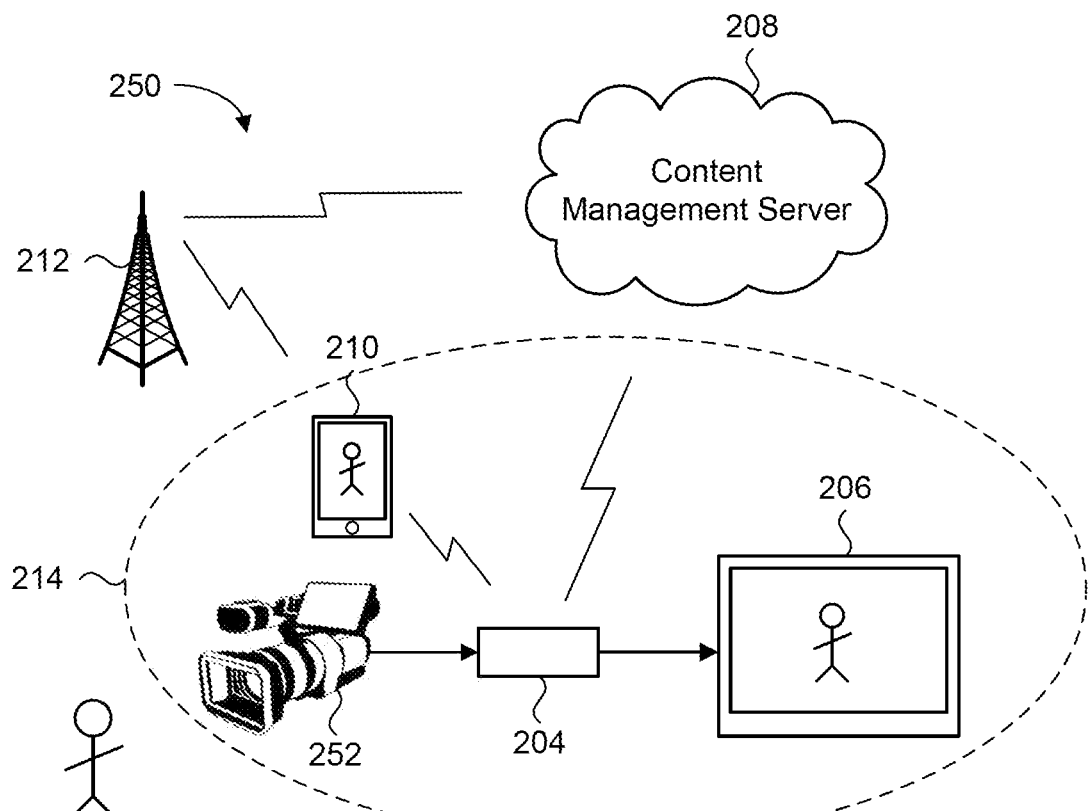
FIG. 4 shows an example of an alternate cyber-physical system embodiment of FIG. 1, configured for remote acquisition of video content based Internet information, according to a present embodiment.

FIG. 4 shows an example of an alternate cyber-physical system embodiment of FIG. 1, configured for remote acquisition of visual content based Internet information, according to a present embodiment. System 250 includes the same numbered elements as the embodiment of FIG. 2, except that the computer 202 of FIG. 2 is replaced with a video camera 252 in the embodiment of FIG. 4. In the embodiment of FIG. 3, video camera 252 has a cable connected to the input port of content enabling device 204 for providing a live video feed or time changing content.

The embodiment of FIG. 4 can be set in a concert environment by example, where professional grade cameras and operators record footage of the concert for presentation on a large billboard type electronic display panel. Because of the large area of a concert venue, wireless repeaters may be used to provide coverage for all users in the venue for communicating with content enabling device 204. It is well known that attendees of a concert use their mobile phones to take pictures or videos of the performance. However, the concert venue tends to have poor lighting, the angle and distance of the user to the concert stage may not provide the desired photo or video. These and other factors result in poor videos and pictures being taken by the attendee. However, the professional cameras are suited for capturing high quality pictures and video in a concert environment, and are usually optimally positioned in front of the stage. Therefore, the presently described system of FIG. 4 can be used to allow attendees to capture high quality images and video direct from the camera 252.

In the embodiment of FIG. 4, video camera 252 being the content source, outputs video content. As the video content is received by content enabling device 204, snapshots and thumbnails can be generated at preset time intervals in the same manner as previously discussed for the embodiment of FIG. 2. This allows users to request professional grade pictures of the live event as seen by camera 252. Up to this point, the operation of content enabling device 204 is the same as described in the previous embodiments. However, the mobile device 210 application is further configured specifically to capture video segments presented on electronic display panel 206.

In the embodiment of FIG. 4, content enabling device 204 can upload the entire video to CMS 208 in real time. In this technique, the start time of the video is timestamped by with the common reference time. Alternately, the entire high-quality video may be digitally recorded by the camera 252, and the entire recorded video is uploaded to CMS 208 at a later time by transmitting the video data to CMS 208 in any manner. Similar to the previously described embodiment of FIG. 2, the video is uploaded with meta-data indicating the device ID of content enabling device 204, the location of which is known to CMS 208. When uploaded, a start time of the video as recorded during the live event is associated with the video at CMS 208, which can be the common reference time.

The mobile device 210 can be configured to recognize different actuations for different functions. By example, one type of actuation can correspond to a user request for an image of the video presented on electronic display panel 206, similar to the previously described embodiment of FIG. 2. A second type of actuation can correspond to a video segment start time request and video segment end time request. Therefore, the mobile device 210 can be used to capture both static images and video segments. The following discussion assumes actuations are made to capture video segments.

Actuation of the mobile device 210 a first time during presentation of the video content on electronic display panel 206 establishes a start time for the desired video segment.

This start time corresponds to a specific instance of the time changing content that is the video. At a later time, the mobile device 210 is actuated a second time to set an end time for the desired video segment. The end time corresponds to another specific instance of the time changing content that is the video. In the present embodiment, a first token can be generated by mobile device 210 at the time of first actuation, including the location, direction and the start time, and sent to CMS 208. Then a second token can be generated by mobile device 210 at the time of second actuation, including the location, direction and the end time, and sent to CMS 208. Alternately, a single video request token including the location, direction, start time and end time is generated at the time of second actuation and sent to CMS 208.

Different techniques are now described for generating the requested video segment based on the start and end times provided in one or two tokens.

Figure 5:
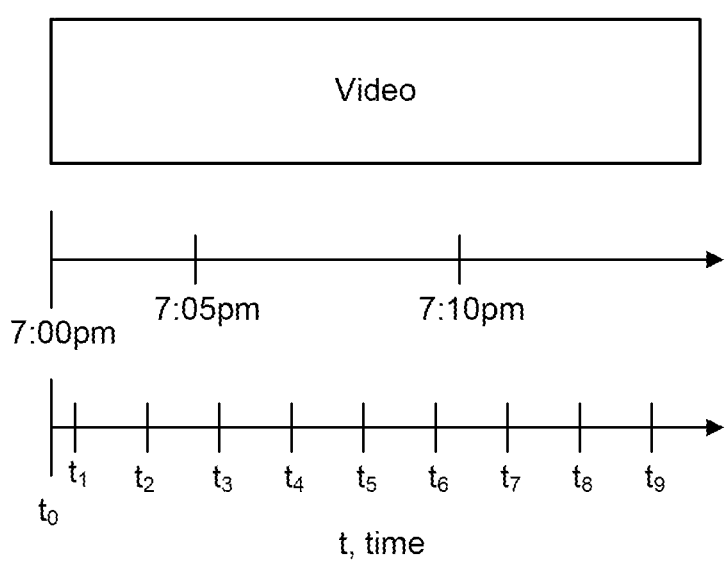
FIG. 5 is an example timeline showing when snapshots are taken by a content enabling device for video content, according to a present embodiment.

In a first technique the thumbnails and corresponding timestamps are received by the mobile device 210. Therefore, the start time can be the same as the last timestamp received at the time of first actuation. Similarly, the end time can be the same as the last timestamp received at the time of second actuation. FIG. 5 provides an example illustration of this technique. The application running on the mobile device 210 can optionally present the last received thumbnail on the mobile device 210 display to confirm that a video segment start time request has been made. Similarly the mobile device 210 can optionally present the last received thumbnail on the mobile device 210 display to confirm that a video segment end time request has been made.

In FIG. 5, the start time of the recorded video is timestamped with the current Greenwich time or a common reference time corresponding to system timestamp $t_0$. Therefore actuations of the mobile device 210 after the video starts are made relative to this known reference time. As shown in FIG. 5, the start of the video at time $t_0$ is timestamped with the current Greenwich time 7:00 pm, and the mobile device 210 was actuated at a first time of 7:05 pm and at a second time of 7:10 pm during the presentation of the video. Actuation of the mobile device 210 at 7:05 pm corresponds to the thumbnail corresponding to time stamp $t_2$, as this was the last thumbnail received by the mobile device 210 before the next thumbnail with time stamp $t_3$ is received. Actuation of the mobile device 210 at 7:10 pm corresponds to the thumbnail corresponding to time stamp $t_6$, as this was the last thumbnail received by the mobile device 210 before the next thumbnail with time stamp $t_7$ is received. Therefore CMS 208 receives a video segment start time request for timestamp $t_2$ and a video segment end time request for timestamp $t_6$ in the respective tokens or single token.

In a second technique, no timestamps are received by the mobile device 210. Therefore, the mobile device functions similar to the previously described embodiment of FIG. 2. In other words, the start time and end time can be based on the common reference time, or can be based on a local time of the mobile device 210.

The token or tokens generated by the mobile device 210 are transmitted to CMS 208 for preparation of the requested video segment.

CMS 208 executes the same functions as described for the embodiment of FIG. 2 for static image requests. For video segment requests, CMS 208 executes the same functions as described for the embodiment of FIG. 2. The token is deemed valid if the location parameter of the token is located within the content enabled region 214. Then the video associated with the location of content enabling device 204 is retrieved. The direction information is ignored as it is not relevant for matching the token to content stored in CMS 208.

CMS 208 can determine the requested video segment in different ways, depending on the time parameter received in the tokens and if snapshots of the video are generated or not. Following is a description of an embodiment where snapshots of the video are provided to CMS 208.

In the embodiment where the time parameters are based on timestamps received by the mobile device, and therefore already properly synchronized to the start time of the video, CMS 208 can execute video processing software to extract the video segment. Using the example outlined in FIG. 4, because the time parameters are based on the same common reference time attached to the start time of the video, CMS 208 can automatically execute a video editing application to generate the requested video segment of duration $t_2$ to $t_6$ and subsequently deliver it to the mobile device 210 or user account.

In an alternate embodiment, timestamps are not received by the mobile device 210, but the start and end times of the token are still based on a common reference time with the content enabling device 204. Therefore the start and end times of the tokens are already properly synchronized with to the start time of the video, and the video editing application can generate the requested video segment using the start and end times.

In a further alternate embodiment where the start and end times is based on a local time of the mobile device 210, CMS 208 determines an offset between the common reference time and the local time of the mobile device 210 (once it is connected to the Internet), and applies the offset to the start and end times to calibrate it to the common reference time. With the start and end times calibrated to the common reference time of the video, the video editing application can generate the requested video segment using the calibrated start and end times.

Once the video segment has been generated, it can be delivered to the mobile device or user account, with any additional preset Internet content. It should be understood that one type of time parameter is used for static image requests and one type of time parameter is used for video segment requests. For example, the type of time parameter used by all mobile devices for the embodiment of FIG. 2 will be based on a time stamp provided by the content enabling device 204, and the type of time parameter used by all mobile devices for the embodiment of FIG. 4 will be based on a local time of the individual mobile devices. Both can be the same or different, and particular selection of which type of time parameter to use is a design parameter for the system.

In the previously described embodiments of FIGS. 2 and 4 the direction information of the mobile device 210 is an optional component that is sent to CMS 208 but not used, and thus can be omitted. According to a further embodiment, the direction information can be used in an environment where there are at least two content enabling devices 204 present within wireless range of a mobile device 210, each presenting different content. It is possible that such environments utilize wireless extenders to increase the area of coverage. If GPS service is unavailable, beacons can be used to report locations to the mobile devices. If the user actuates their mobile device 210 to request more information in response to displayed content, the CMS 208 needs to know which specific content the user has selected. According to a present embodiment, the location and direction information provided by mobile device 210 can be used by CMS 208 to determine which content was selected by the user, via mobile device 210.

Figure 6:
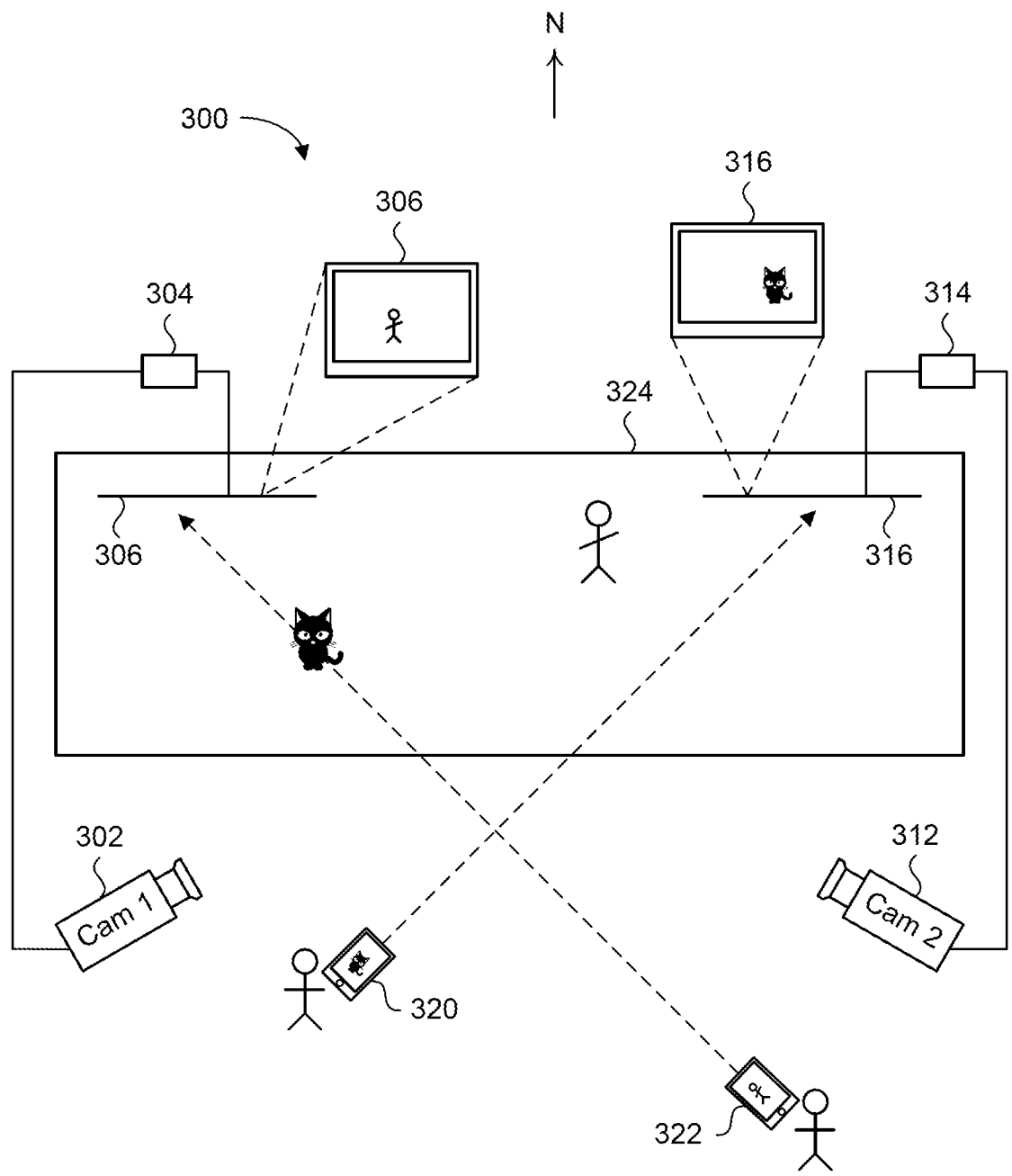
FIG. 6 shows an example of an alternate cyber-physical system based on the embodiment of FIG. 1, configured for remote direction based acquisition of video content, according to a present embodiment.

FIG. 6 shows an example of an alternate cyber-physical system based on the embodiment of FIG. 1, configured for remote direction based acquisition of visual content, according to a present embodiment. The present embodiment is described in the context of a concert venue having the floor plan layout shown in FIG. 6. Cyber-physical system 300 includes a first video camera 302, a first content enabling device 304, a first electronic display panel 306, a second video camera 312, a second content enabling device 314, a second electronic display panel 316 and mobile devices 320 and 322. In the layout of FIG. 6, the display panels 306 and 316 are mounted above stage 324, upon which people or objects stand upon. The orientation of the venue is shown relative to magnetic or true north "N", the position of which is shown at the top of FIG. 6. A content management server (CMS) and cellular communications network are also part of system 300, but not shown in FIG. 6. The video cameras 302 and 312 are positioned at different areas of the venue so that different angles and parts of the stage can be recorded.

Video camera 302, content enabling device 304 and electronic display panel 306 are connected to each other and configured in the same manner as camera 252, content enabling device 204 and electronic display panel 206 of FIG. 4. Similarly, video camera 312, content enabling device 314 and electronic display panel 316 are connected to each other and configured in the same manner as camera 252, content enabling device 204 and electronic display panel 206 of FIG. 4. For the system 300 of FIG. 6, the location of electronic display panels 306 and 316 are programmed in the CMS, and the content enabling devices 304 and 314 communicate wirelessly with the mobile devices 320 and 322. If required, wireless repeaters can be used to increase wireless coverage throughout the concert venue area. Each mobile device 320 and 322 includes an application configured to respond to any type of actuation thereof to request an image or video segment, in the same manner as described for the embodiment of FIG. 4. It is assumed the content enabled region covers the entire concert venue.

Requests generated by the mobile devices 320 and 322 via the applications will also include a location of the mobile device and direction the mobile device is being pointed at, in addition to the other previously discussed content ID parameters of time and location. It is assumed the compass within the mobile devices 320 and 322 provides a direction relative to magnetic north and that the user will actuate their mobile device as it is pointed towards the electronic display panel showing content they are interested in. Because the locations of electronic display panels 306 and 316 are known to the CMS, the CMS can approximate which of electronic display panels 306 and 316 a specific mobile device is pointing at once its location and direction are known.

By example, based on the location and direction of mobile device 322 in the token(s) sent to the CMS, the CMS will provide snapshots or video content based on the content presented on electronic display panel 306. Similarly, based on the location and direction of mobile device 320 in the token(s) sent to the CMS, the CMS will provide snapshots or video content based on the content presented on electronic display panel 316.

The calculation for determining the electronic display panel selected by a mobile device is easily performed. By example, a vector of infinite length extending from the mobile device in the reported direction intersecting a line segment representing the display at a known location indicates which display is selected by the user. Alternately, the display represented by a line segment closest in distance to a passing vector can indicate which display is selected by the user. Now that a specific content enabling device has been identified, any snapshots and/or video received by that content enabling device can be later provided to the mobile device or user account by the CMS. Static image and video segment requests can be processed in the same way as previously described in the embodiments of FIGS. 2 and 4.

In addition to static images and video segments being provided to the mobile device, the CMS can be configured to provide supplemental Internet information related to the selected content. This can include for example, additional video footage of the performer, coupons and any other promotional information which can be delivered to a mobile device.

Furthermore, the CMS can be programmed to provide different levels of content based on the type of ticket purchased by a user. For example, a VIP ticket can entitle the user to receive bonus content that is not available to a purchaser of a regular ticket when requests for images or video segments are made. The CMS can differentiate such users by prompting them to enter a unique code printed on their ticket into the mobile device application, which then associates the bonus content to their account. The CMS can include a database or table mapping the unique codes to specified levels of content. In contrast, individuals who did not purchase tickets but may be within wireless range of the content enabling devices 304 and 314 (ie. outside of the venue), will only receive simple advertisements or no content at all upon actuation of their mobile device. These aforementioned features can be applied to the previously described embodiments of FIGS. 2 and 4.

Figure 7:
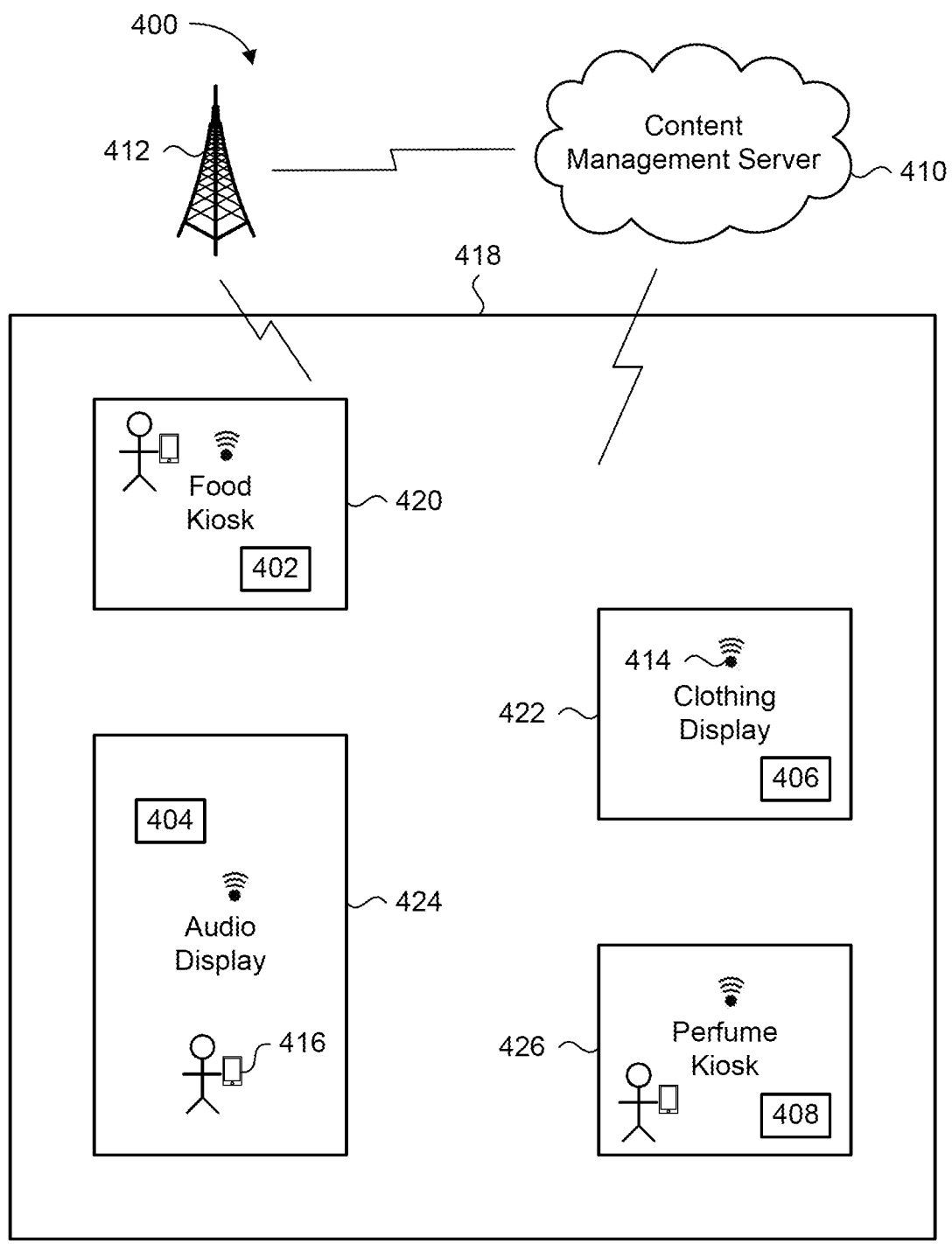
FIG. 7 shows an example of an alternate cyber-physical system based on the embodiment of FIG. 1, configured for remote acquisition of non-visual sensory content, according to a present embodiment.

The previously described cyber-physical systems are examples of how visual content can be captured by the user upon actuation of their mobile device. As mentioned earlier, the embodiments of the present invention are not limited to visual content. FIG. 7 shows an example of an alternate cyber-physical system based on the embodiment of FIG. 1, configured for remote acquisition of non-visual sensory content, according to a present embodiment. The presently described embodiment is described in the context of a department store floor.

Cyber-physical system 400 includes a plurality of content enabling devices 402, 404, 406 and 408, a Content Management Server (CMS) 410, an optional cellular communications network 412, wireless beacons 414 if there is no GPS service available, and at least one wirelessly enabled mobile device 416, of which only one is labelled in FIG. 7. As there is no real time multi-media content being presented, the content enabling devices 402, 404, 406 and 408 do not take snapshots or broadcast thumbnails with timestamps. However, each of the content enabling devices 402, 404, 406 and 408 can wirelessly broadcast to mobile devices that they have entered a respective content enabled region. The department store floor 418 has separate kiosks or displays 420, 422, 424 and 426, and within each kiosk or display is located a respective content enabling device and a wireless beacon 414. The wireless beacons 414 are not required if the GPS transceiver of the mobile device 416 can accurately and reliably communicate with the GPS satellite system. Otherwise, the wireless beacons 414 can provide location information of the respective content enabling devices 402, 404, 406 and 408 should the a mobile device enter a content enabled region. Because the locations of content enabling devices 402, 404, 406 and 408 is configured in CMS 410, the CMS 410 can therefore be programmed to provide preset content for each of content enabling devices 402, 404, 406 and 408.

In the present embodiment, the food kiosk 420 displays food content for tasting by users; the clothing display presents a particular clothing item to be touched as the fabric may be new; the perfume kiosk 426 each displays a unique perfume scent for smelling by users; and audio display 424 presents sample music content provided by a particular audio manufacturer, or musical artist, for example. Each display can be accompanied by a message or sign indicating which product can be subject to requests for more Internet content. Accordingly, any user browsing the floor 418 can approach any of the kiosks or displays 420, 422, 424 and 426 and actuate their mobile device in response to the sensory stimulus that is provided in order to obtain more information. In the present embodiment, actuation of the mobile device 416 results in generation of a token having the previously described content ID parameters, which is sent to CMS 410. CMS 410 can then determine using the location of the mobile device 416, the specific content enabling device it is located closest to. In the present example of FIG. 7, mobile device 416 is most proximate to content enabling device 404. Therefore CMS 410 delivers preset content corresponding to content enabling device 404 to mobile device 416 or a user account.

It should be noted that if the content enabling devices 402, 404, 406 and 408 are close to each to each other and within a single content enabled region, then the direction information of the mobile device can be used to determine, along with the location of the mobile device, which of the content enabling devices the mobile device is pointing at.

Figure 8:
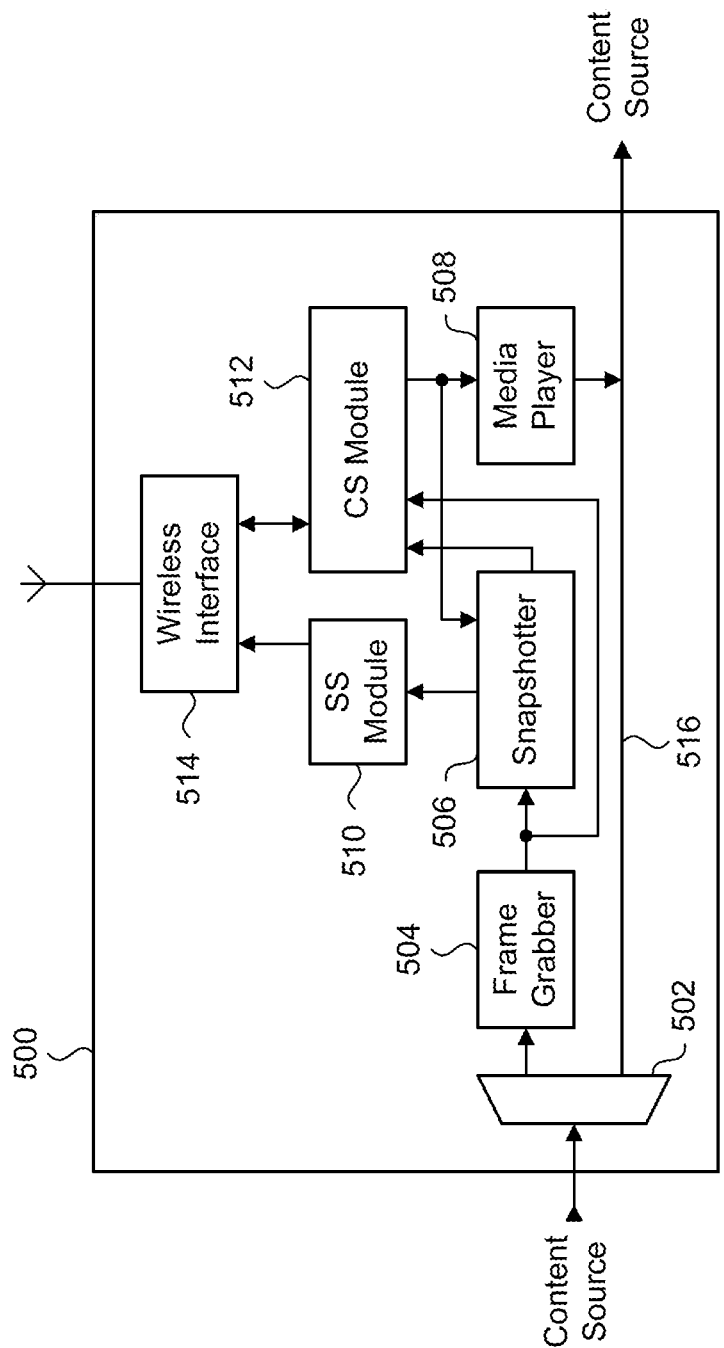
FIG. 8 is a block diagram of a content enabling device according to a present embodiment; and, FIGS. 9A, 9B, 9C and 9D are flow charts of a method for remote acquisition of Internet information, according to a present embodiment.

FIG. 8 is a block diagram of a content enabling device 500 according to a present embodiment. The content enabling device embodiment of FIG. 8 is the same device used in all the previously described cyber-physical systems. Content enabling device 500 includes an input signal splitter 502 connected to an input port for receiving multi-media content, a frame grabber 504, a snapshotter 506, a media player 508, a synchronization and scheduling (SS) module 510, a cloud server (CS) interface module 512 and a wireless interface 514. In one embodiment, the content enabling device 500 is a physical module containing all the above mentioned components.

The input signal splitter 502 receives any multi-media content provided from a content source, such as a video camera or a computer for example, and splits it into two separate streams. A first output stream of input signal splitter 502 is provided directly to a channel 516 that is connected to an output port of the box. A second output stream of input signal splitter 502 is provided to frame grabber 504.

The frame grabber 504 decodes the multi-media content received in real-time, into a raw video format for further processing. By example, the received signal can be an HDMI signal that is transformed by the frame grabber 504 into a BT.656 format, which is a suitable format for presentation on PAL or NTSC standard definition displays. The BT.656 format is one example video format the received multi-media signal can be converted into, and the received multi-media signal can be converted into any format depending on the application and the required format of the display. In an alternate embodiment, the frame grabber 504 may not be necessary. The converted output of frame grabber 504 is provided to snapshotter 506.

In applications where a content source or media player 508 provides static or video, snapshotter 506 is responsible for capturing at a particular point in time, an image of the decoded multi-media content received from frame grabber 504. Snapshotter 506 can be configured to capture images at regular intervals, where the captured images are at the native resolution and thus considered high quality images. The snapshotter 506 further generates a downsized or low resolution version of the captured image, referred to as a thumbnail. Many techniques are known for generating low resolution versions of images. The high-quality image is provided to the CS interface module 512 while the corresponding thumbnail image is provided to the synchronization module 510. The snapshotter 506 attaches to both the thumbnail and the corresponding high quality image the same timestamp that is approximately the same time the image is provided on the output port of the content enabling device 500 for presentation on a visual display.

The SS module 510 is configured to schedule and multicast the thumbnails to the mobile devices as well as to synchronize the mobile devices and video content so that the mobile device is aware of which received thumbnail should be popped up on their screens when a request for content is made.

The CS interface module 512 communicates with the Content Management Server (CMS). The CS interface module 512 makes it possible that multiple distributed content enabling devices 500 form an Internet of things system that can be used to provide some location based services. In the previously described embodiments, multi-media content is provided from a content source connected to the input signal splitter 502 via the aforementioned input port of the box. In such embodiments, the CS interface module 512 is configured to transfer the snapshotted images along with the corresponding tokens from the mobile devices to the CMS. Alternately, the tokens from the mobile device can be issued directly to the CMS.

In an alternate embodiment, the content source can be the Internet, meaning that multi-media content is provided from a source connected to the Internet. For example, the content source on the Internet can be a video file created by a content owner. In such an embodiment, the multi-media content is provided to the CS interface module 512, which sends the received multi-media content to the media player 508 and to the snapshotter 506. The snapshotter 506 executes the previously described function upon the received multi-media content. The media player 508 converts the received multi-media content, which can be provided in any format, into any suitable video format for output onto channel 516 and an electronic display panel.

In yet a further alternate embodiment, the CMS can be configured to provide the multi-media content, which is then received by CS interface module 512 and provided to media player 508 and snapshotter 506. This multi-media content can be static images or video. The earlier mentioned time-stamping and mobile device time synchronization techniques can be applied to multi-media content provided by media player 508. In the embodiments where no content source is received, frame grabber 504, snapshotter 506, media player 508 and SS module 510 are not used.

The wireless interface 514 provides wireless communication between a local area network (LAN) connected to the Internet, to which the CMS and mobile devices are in communication with, and the SS module 510 and CS interface module 512. By example, wireless interface 514 can be a WiFi interface. Thumbnails with timestamps provided by the SS module 510 can be wirelessly broadcast to mobile devices held by users in an area where the content is presented, while tokens issued by mobile devices, such as for images and video segments, are received by the CS interface module 512. Finally, snapshots generated by the snapshotter 506 are transmitted to the CMS via a wireless router connected to the Internet. The power of the wireless interface 514 is configurable to set the wireless range so that the content enabled region size can be configured by the CMS. The CS module 512 can issue a message or a simple graphic to mobile devices when in range of wireless interface 514 that they have entered a content enabled region.

The content enabling device 500 can be implemented as an FPGA (field programmable gate array) daughter board plug-in with an embedded mini-computer system, equipped with a low-end ARM processor. The FPGA can be configured to include the input signal splitter 502, the frame grabber 504, and the snapshotter 506, while the processor can be programmed to execute the functionality of the SS module 510 and the CS interface module 512.

FIGS. 9A, 9B, 9C and 9D are flow charts summarizing the overall processes executed by the content enabling device, mobile device and CMS which have been shown in the various cyber-physical system embodiments for acquiring content.

Figure 9A:
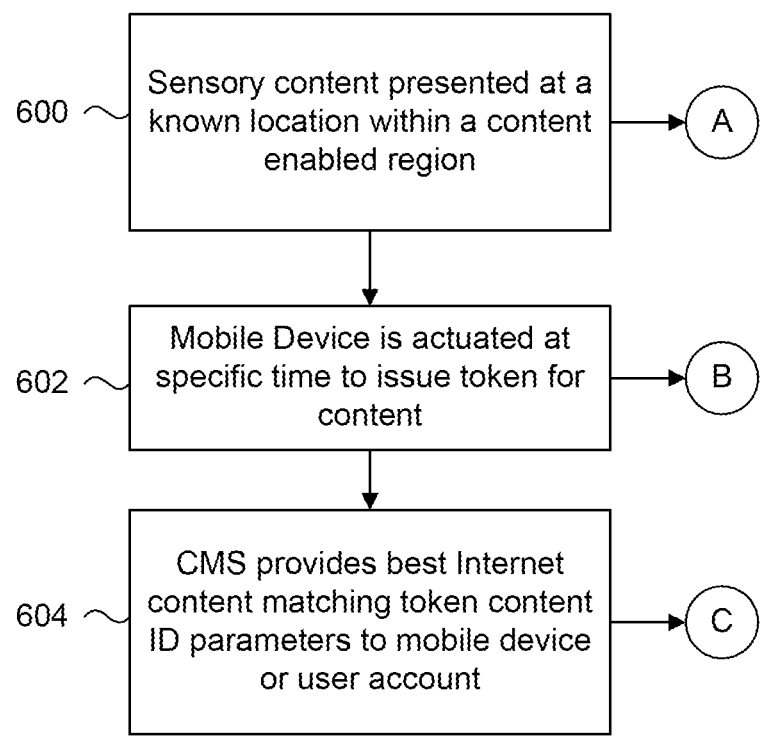

FIG. 9A, outlines the general method steps executed by the previously described cyber-physical system examples, according to a present embodiment. Starting at 600, sensory content is presented at a known location and within a content enabled region. A mobile device can be actuated at 602 by any means at a specific time to make a request for content, typically in response to some sensory stimulus at 600. This request takes the form of a token that includes at least one content ID parameter. At 604, the CMS receives the token issued by the mobile device, matches the token content ID parameters to the closest matching content, and provides related Internet content to the mobile device or an account of the user of the mobile device. This Internet content can include snapshots or video segments presented as sensory content in 600.

Figure 9B:
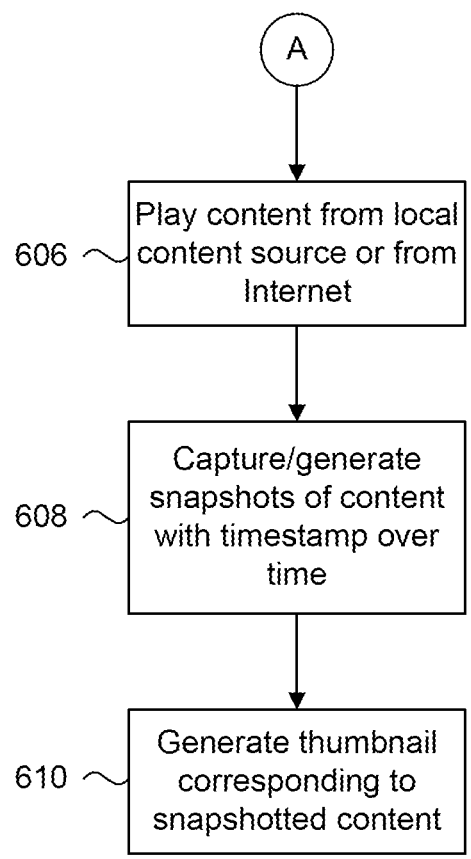

The flow chart shown in FIG. 9B outlines the steps executed by the content enabling device in step 600 of FIG. 9A. In the visual based sensory embodiments, the content enabling device plays content from a local content source or from the Internet at 606, which can be video or a static image. This content can be presented on an electronic display panel. At 608 snapshots of the running content are captured at specified intervals of time with corresponding timestamps. In the case of video being played, snapshots may not be generated and the entire video is uploaded to the CMS in real time or at a later time. At substantially the same time low resolution thumbnail images corresponding to the snapshots are optionally generated with the snapshot timestamp and broadcast to the mobile devices at 610. Steps 606, 608 and 610 are not required in embodiments where no visual based sensory content is presented.

Figure 9C:
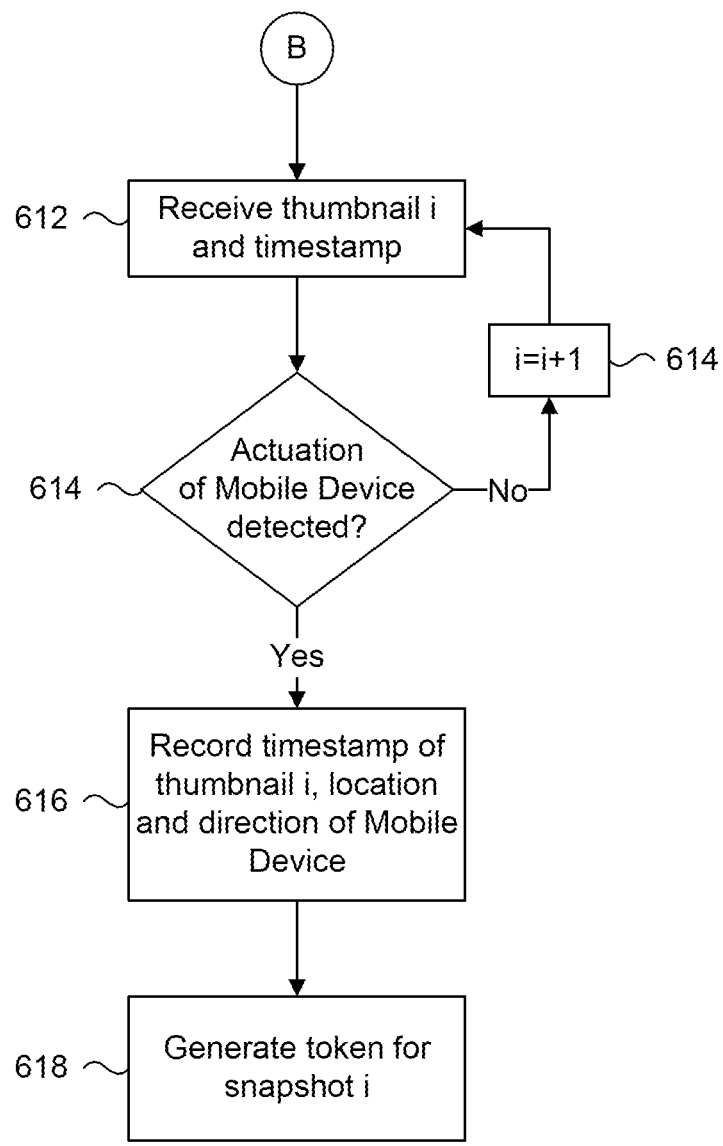

The flow chart shown in FIG. 9C outlines the steps executed by the mobile device in step 602 of FIG. 9A for requesting static image or video content, and is presumed to work in conjunction with the steps outlined in FIG. 9B. At 612, the mobile device receives a first thumbnail i and a corresponding timestamp. If at 614 the mobile device detects actuation thereof the method proceeds to 616. Otherwise, the method returns to 612 and the mobile device receives the next thumbnail (i=i+1). Assuming actuation of the mobile device was detected at 614, at 616 the last received timestamp is recorded as is the location and direction information of the mobile device. At 618 the mobile device generates a request for snapshot "i", which takes the form of a token that includes at least the last timestamp received before actuation of the mobile device, location and direction information of the mobile device and the mobile device ID. For the video segment request embodiment, this first iteration of 612-618 can be considered a video start time request. The mobile device will then execute a second iteration of 612-618 for a video end time request. Alternately, the received timestamp can be replaced with a common reference time shared with the content enabling device, or a local time of the mobile device at 616.

Figure 9D:
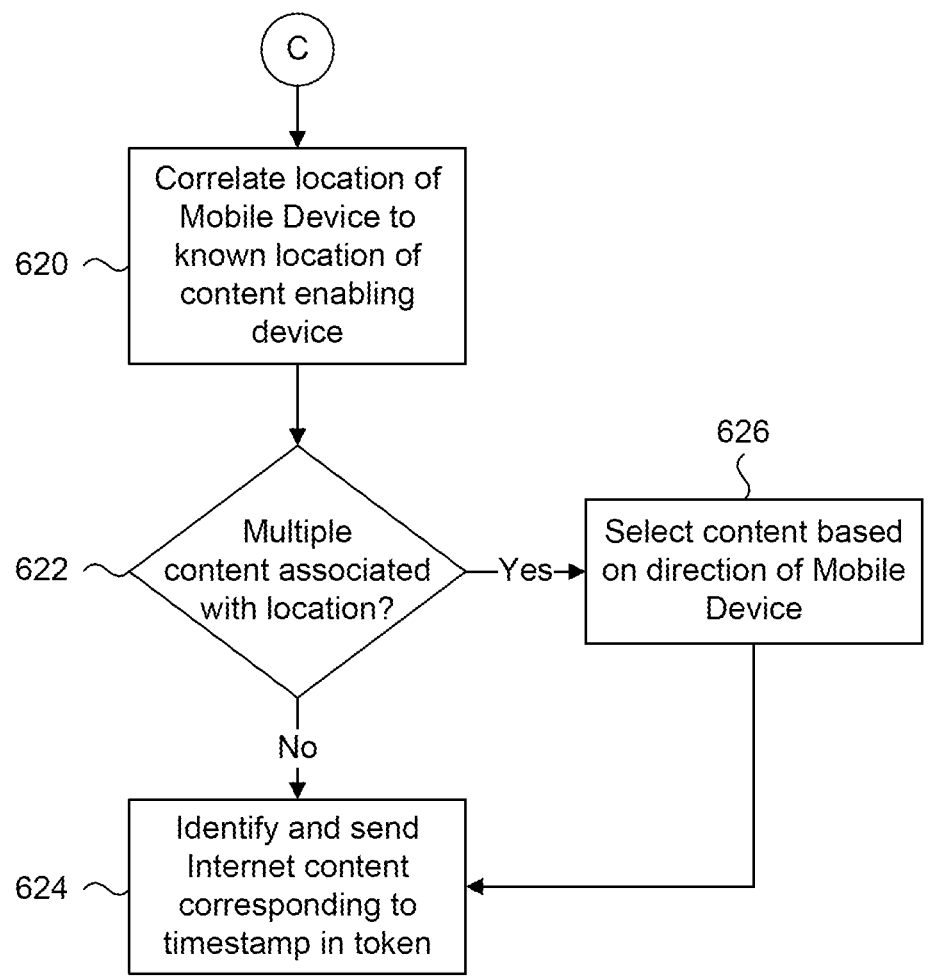

The flow chart shown in FIG. 9D outlines the steps executed by the CMS in step 604 of FIG. 9A. It is assumed the mobile device token has been received by the CMS. At 620 the CMS correlates the location of the mobile device to a known location of content being provided by at least one content enabling device. If the location falls outside of a content enabled region, the method ends here. Assuming the location falls within a content enabled region, the CMS then determines if there are multiple contents, corresponding to content enabling devices, associated with the same location at 622. This can be the situation of the concert venue embodiment of FIG. 6 by example. If there is just one content associated with the location of the content enabling device, the method proceeds to 624. Otherwise, if there are multiple contents, the direction information, location of the mobile device and locations of the content enabling device are processed through simple geometric calculations to determine which content enabling device or electronic display panel is pointed at by the requesting mobile device at 626.

At 624, the snapshot or video segment requested by the token(s) is delivered to the mobile device or user account. This step can include the time synchronization and calibration techniques which were discussed earlier, if timestamps from the content enabling device are not used in the tokens. Further preset information related to the snapshot can be delivered to the mobile device or user account. The combination of the snapshot, video segment and further preset information are considered the Internet content.

In the previously described embodiments, it is assumed that some type of location information is determined by the mobile device using its built in GPS transceiver, or location information is provided to the mobile device by beacons, for the purposes of generating a token for the content management server. In the event a GPS signal is not available or is reporting incorrect location information due to the environment, and no beacons or similar devices are employed to provide location information to the mobile device, an alternate embodiment is provided for allowing mobile devices to request Internet information relating to sensory content in a content enabled region. In this alternate embodiment, the content enabling device is configured to broadcast its unique device ID. The mobile device application is configured to generate a token to include the device ID or other unique associated identifier as part of the previously described content ID parameters. This device ID in the token indicates the request for Internet information is valid, and identifies the specific content associated with the specific content enabling device.

Therefore, it is assumed for this embodiment that the content enabled region is the same as the wireless range of the content enabling device, which would include the wireless range when wireless range extenders are used. Accordingly, if the mobile device is within wireless range of the content enabling device and is actuated by the user, then the token is generated in the same manner as previously described and further includes the broadcasted device ID of the content enabling device. The device ID allows the CMS to match digital media and other Internet information associated with the content enabling device ID. Because the location information is not available, or incorrect due to the environment, the CMS can be configured to ignore the location information in the token when the device ID is present.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of remote acquisition of digital information, comprising:
providing wireless connectivity to a content enabled region;
presenting sensory stimulus corresponding to digital content to a user of a mobile device, the mobile device being within the content enabled region;
actuating the mobile device by the user at a specific time within the content enabled region to generate a token including at least one content identification parameter of location of the mobile device;
determining if the location of the mobile device in the token is within the content enabled region;
selecting the digital content based on the at least one content identification parameter of the token, from a server configured to store the digital content corresponding to the sensory stimulus; and,
providing the digital content to the mobile device or a user account when the location of the mobile device is determined to be within the content enabled region.

2. The method of claim 1, wherein the location of the mobile device is based on a built-in GPS transceiver of the mobile device.

3. The method of claim 1, wherein the location of the mobile device is based on a beacon.

4. The method of claim 1, further comprising:
recording a time parameter by the mobile device at the specific time; and
the at least one content identification parameter further includes the time parameter.

5. The method of claim 4, wherein the sensory stimulus comprises time changing content.

6. The method of claim 5, further comprising:
identifying a specific instance of the time changing content that is closest in time to the time parameter.

7. The method of claim 4 wherein presenting sensory stimulus comprises displaying digital media as visual stimuli.

8. The method of claim 7 wherein the digital media includes static images.

9. The method of claim 8 further comprising:
periodically generating a snapshot of the static images with a corresponding timestamp;
storing the snapshot and the corresponding timestamp;
generating a low resolution thumbnail corresponding to the snapshot; and
wirelessly broadcasting the thumbnail and the corresponding timestamp of the snapshot.

10. The method of claim 9 further comprising:
receiving at the mobile device, the timestamp for the corresponding thumbnail wherein the timestamp is used as the time parameter;
matching the time parameter to the stored snapshot having the same timestamp.

11. The method of claim 10 further comprising providing a time of the mobile device is actuated as the time parameter; and
matching the time parameter to one of the previously received plurality of stored snapshots having the closest timestamp.

12. The method of claim 7 wherein the digital media includes video.

13. The method of claim 12 further comprising:
generating a timestamp corresponding to a start time of the video; and
storing the video and the start time.

14. The method of claim 13 wherein:
actuating the mobile device at the specific time corresponds to a first actuation for requesting a start time of a video segment request;
actuating the mobile device at a second specific time corresponds to a second actuation for requesting an end time of the video segment request;
generating the token further comprises including the start and end times of the video segment request; and
generating a video segment of the stored video based on the start and end times included in the token relative to the start time of the video.

15. The method of claim 14 wherein:
the start time of the video is based on a common reference time; and
the start and end times of the video segment request are based on a local time of the mobile device.

16. The method of claim 15 further comprising:
calculating an offset between the common reference time and the local time; and
based on the offset, correcting the start and end times of the video segment request to the common reference time.

17. The method of claim 1, further comprising:
recording on the mobile device, a direction of the mobile device from a built-in compass; and
the at least one content identification parameter further includes the direction of the mobile device.

18. The method of claim 1, wherein presenting sensory stimulus comprises presenting first and second sensory content at the location spaced apart from each other, where locations of the first and second sensory content are preset.

19. The method of claim 18 further comprising:
calculating which of the first sensory content and second sensory content the mobile device is pointed at as determined by the location of the mobile device and the direction of the mobile device, and
selecting the digital content corresponding to the first sensory content or the second sensory content the mobile device is pointed at.

20. The method of claim 1, wherein
an apparatus providing the wireless connectivity broadcasts a device ID,
generating the token further includes the device ID received by the mobile device, and
the digital content is selected based on the device ID when the location of the mobile device is undetermined.

21. The method of claim 1, wherein the mobile device receives a device ID of an apparatus providing the wireless connectivity, and the location of the mobile device is based on the device ID provided in the token.

* * * * *